(12) United States Patent
Siegel et al.

(10) Patent No.: US 7,149,353 B2
(45) Date of Patent: Dec. 12, 2006

(54) METHOD AND SYSTEM FOR SUPPRESSION OF FEATURES IN DIGITAL IMAGES OF CONTENT

(75) Inventors: Hilliard Siegel, Seattle, WA (US); Jeffrey Bezos, Seattle, WA (US)

(73) Assignee: Amazon.com, Inc., Seattle, WA (US)

( * ) Notice: Subject to any disclaimer, the term of this patent is extended or adjusted under 35 U.S.C. 154(b) by 0 days.

(21) Appl. No.: 10/668,690

(22) Filed: Sep. 23, 2003

(65) Prior Publication Data
US 2005/0063615 A1    Mar. 24, 2005

(51) Int. Cl.
G06K 9/46    (2006.01)
(52) U.S. Cl. ............... 382/190; 345/619; 382/175; 382/176; 382/310; 715/520; 715/526
(58) Field of Classification Search ............... 345/597, 345/617, 619; 382/163, 171, 175, 309, 176, 382/190, 310, 311; 709/206, 217; 715/781, 715/866, 520, 521
See application file for complete search history.

(56) References Cited

U.S. PATENT DOCUMENTS

| | | | |
|---|---|---|---|
| 5,821,929 A * | 10/1998 | Shimizu et al. ............. 382/190 |
| 6,043,823 A * | 3/2000 | Kodaira et al. ............. 345/619 |
| 6,353,831 B1 | 3/2002 | Gustman |
| 6,385,614 B1 | 5/2002 | Vellandi |
| 6,449,636 B1 * | 9/2002 | Kredo et al. ................. 709/206 |
| 6,562,077 B1 * | 5/2003 | Bobrow et al. ............. 715/517 |
| 6,609,105 B1 | 8/2003 | Van Zoest et al. |
| 6,701,350 B1 * | 3/2004 | Mitchell ..................... 709/217 |
| 6,782,144 B1 * | 8/2004 | Bellavita et al. ............ 382/310 |
| 6,809,741 B1 * | 10/2004 | Bates et al. ................. 345/597 |
| 6,961,905 B1 * | 11/2005 | Cover et al. ................ 715/760 |
| 2005/0063615 A1 * | 3/2005 | Siegel et al. ................ 382/309 |

* cited by examiner

*Primary Examiner*—Gregory Desire
(74) *Attorney, Agent, or Firm*—Christensen O'Connor Johnson Kindness PLLC

(57) ABSTRACT

Suppression of one or more features in an image of a page of content may be achieved by acquiring a page image, identifying one or more features in the page image that are to be suppressed or not to be suppressed, and preparing a substitute page image which only includes images of the features that are not to be suppressed. Preparing a substitute page image may include generating a blank image and using location and size information to copy images of the non-suppressed features from the original page image to the blank image. In other embodiments, preparing a substitute page image may include removing image information from the original page image outside the non-suppressed features, or identifying and removing features that are to be suppressed from the original page image. Feature suppression may be used to implement access rules that limit the content in a page image.

45 Claims, 12 Drawing Sheets

METHOD AND SYSTEM FOR SUPPRESSION OF FEATURES IN DIGITAL IMAGES OF CONTENT

CROSS-REFERENCE TO RELATED APPLICATION

This application is related to U.S. patent application Ser. No. 10/669,088, titled "PERSONALIZED SEARCHABLE LIBRARY WITH HIGHLIGHTING CAPABILITIES," filed Sep. 23, 2003, and incorporated herein by reference.

FIELD OF THE INVENTION

The present invention is directed to systems and methods for preparing and processing digital images of content in an electronic library of content.

BACKGROUND OF THE INVENTION

The information age has produced an explosion of content for people to read. This content includes traditional media such as books, magazines, newspapers, newsletters, manuals, guides, references, articles, reports, documents, etc. that exist in print, as well as electronic media in which the aforesaid works are provided in digital form. The Internet has further enabled an even wider publication of content in the form of document downloads, such as portable document files and e-books.

Given the vast sea of content that people encounter, it is not uncommon for a person to read something and later recall a memorable phrase or subject, but not remember the exact source of the phrase or subject. The person may attempt to obtain recently read items in an effort to find the phrase or subject, but searching these items in this manner can be tedious, time consuming, and unfruitful. A person may also simply wish to research a particular subject in a set of books or other content that the person owns, has read, or is otherwise aware of.

Separately, various search engines have attempted to catalogue Web pages available on the Internet. However, given the enormous amount of content published electronically on the Internet, searching the entire Internet for a phrase or subject in a particular source the reader recently read can be similar to finding a needle in a haystack. The reader may have to wade through pages and pages of search results provided by search engines, and in the end, may still be unable to locate the desired source. Moreover, the desired source may not have been published on the Internet in the first place, and thus would not be included in this type of search.

Electronic searching of public library catalogs is also known, but such searching is limited to bibliographic information and other meta-information that describe the library content. Full text searching of public library content is not available, and even if it were, the search may produce results from sources that are not of interest to the user.

What is needed is a system and method of providing a library of content that a user can personalize and search electronically, in which the location of specified search terms in the user's personalized library is reported. Desirably, images of some or all of the text, pictures, and other features surrounding the located search terms would be provided for immediate review by the user, consistent with permissions granted for providing such content to the user. Restricted content would be suppressed. The present invention addresses these needs and other shortcomings that currently exist.

SUMMARY OF THE INVENTION

The present invention provides a system and method for preparing and processing digital images of content that have one or more features to be suppressed before the image of content is displayed to a user. In some embodiments, the present invention may be incorporated into an electronically-searchable library comprised of images of pages of content and electronically-searchable text corresponding to the text in the page images. The page images may be stored in a page image database while the corresponding text is stored in a text searchable database.

In one aspect, the present invention provides a method for suppressing one or more features in a page image. Features, such as pictures, graphics, numbers, equations, names, dates, etc., may be suppressed for a variety of reasons including, but not limited to, copyright restrictions or other limiting restrictions. In one embodiment, feature suppression in a page image is achieved by first acquiring an image of a page of content and identifying one or more features in the page image that are to be suppressed or not to be suppressed. A substitute page image is then prepared which only includes images of the features that are not to be suppressed (thus excluding the features to be suppressed). Location and size information for the features in the page image that meet either a suppression criterion or a non-suppression criterion may be used to prepare the substitute page image. For example, the substitute page image may be prepared by generating a blank image and using the location and size information to copy one or more images of the non-suppressed features from the original page image to the blank (substitute) image. This may entail copying pixel information for the non-suppressed features from the original page image to the substitute page image at locations corresponding to the locations of the non-suppressed features in the original page image.

In another embodiment, the substitute page image is prepared by removing image information from the original page image outside of the features that are not to be suppressed. Alternatively, the features to be suppressed may be identified and then removed from the original page image to produce the substitute page image. In any event, the substitute page image may also include background image information that simulates the background information in the original page image prior to feature suppression. For example, background pixel information from one or more locations in the original page image may be duplicated at corresponding locations in the substitute page image and interpolated through the remainder of the substitute page image to produce the background image information for the substitute page image.

Another aspect of the present invention is a computer system that provides an image of a page of content to a user as a result of a search. The computer system may comprise a search server in communication with a database server. The database server may be configured with a library of content that includes (1) a page image database containing images of pages of content, and (2) a text searchable database containing text and information that identifies page images in the page image database that contain the text. The search server may be configured with computer-implemented instructions that enable the search server to retrieve a page image from the page image database based upon a user search, identify one or more features in the page image that are to be suppressed or not to be suppressed, prepare a substitute page image that only includes images of the identified features that are not to be suppressed, and provide the substitute page image to the user.

Yet another aspect of the present invention is an access rights database that includes access rules that act to limit the content in a page image provided to the user. Feature suppression methods described herein may be used to implement the access limitations imposed by an access rule and suppress from view portions of page images before they are displayed to the user. For example, one or more access rules may limit the amount of content displayed to the user in a page image. Alternatively, or in addition, the access rules may define an aggregate amount of content that is provided to the user over a time frame. The access rules may also define the amount of content to be provided to the user based on content-specific information or user ownership of the content. In circumstances where the user owns the content, a greater amount or all of the content may be provided to the user for viewing. Moreover, different access rules may be written to apply based on the location of the user or the time at which the content is to be provided to the user.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
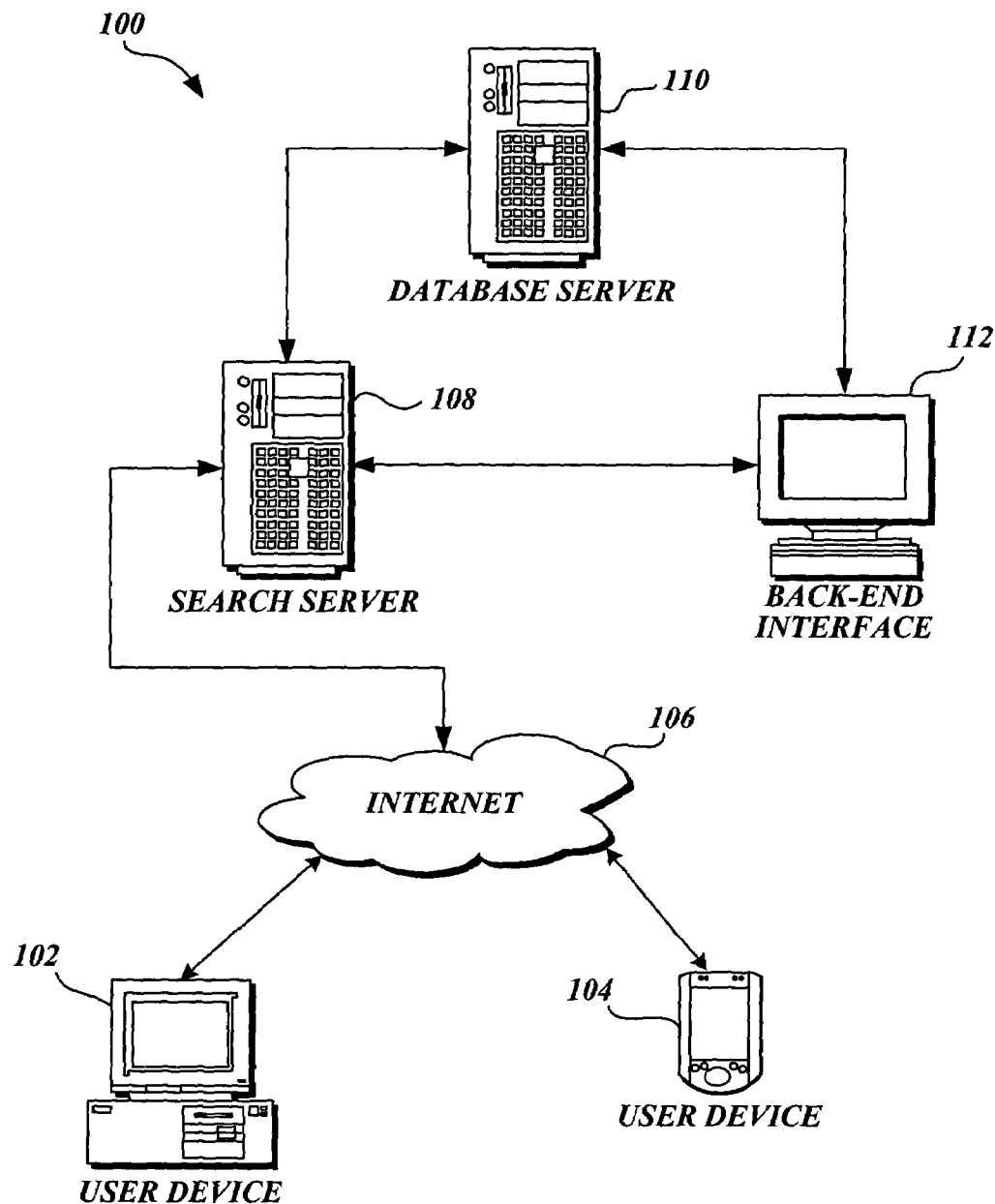
FIG. 1 is a pictorial diagram showing an environment for implementing one exemplary embodiment of the invention.

FIG. 1 illustrates one environment for implementing an embodiment of the present invention. The environment shown includes a library content search system 100 with an electronically-searchable library of content that can be personalized by multiple individual users. The environment also includes various electronic user devices, such as a computer system 102 and a PDA 104, that individual users can use to communicate with the search system 100. In the environment shown in FIG. 1, the user devices 102, 104 communicate with the search system 100 via one or more computer networks, such as the Internet 106. Protocols and components for communicating via the Internet are well known to those of ordinary skill in the art of computer network communications. Communication between user devices 102, 104 and the search system 100 may also be enabled by local wired or wireless computer network connections.

The search system 100 depicted in FIG. 1 operates in a distributed computing environment comprising several computer systems that are interconnected via communication links, e.g., using one or more computer networks or direct connections. However, it will be appreciated by those of ordinary skill in the art that the system 100 could equally operate in a computer system having fewer or greater number of components than are illustrated in FIG. 1. Thus, the depiction of the search system 100 in FIG. 1 should be taken as exemplary, and not limiting to the scope of the invention.

The search system 100 as illustrated includes a search server 108, a database server 110, and a back-end interface 112. Each of the servers 108 and 110 are described below in more detail. The back-end interface 112 allows an operator of the search system 100 to monitor and adjust the operation of the servers 108 and 110 as needed.

In brief, the search server 108 is generally responsible for providing front-end user communication with various user devices, such as devices 102 and 104, and back-end searching services in cooperation with the database server 110. The front-end communication provided by the search server 108 may include generating text and/or graphics, possibly organized as a Web page using hypertext transfer protocols, in response to information and search queries received from the various user devices 102, 104. The search server 108 also is generally responsible for conducting searches of the databases in the database server 110. The database server 110, as described below, maintains the databases that the search server 108 uses to respond to user search queries.

In one suitable implementation, the search system 100 enables a user to review an index that catalogs the general library of content in the databases stored in the database server 110. This general library of content may include various forms of publications, including (but not limited to) books, magazines, newspapers, newsletters, manuals, guides, references, articles, reports, documents, etc. To facilitate user review and selection of content from the general library, various metadata may be associated with the content in the general library. This metadata may include internal attributes, such as title, author, subject, abstract publisher, publication date and place, publication type, characters, etc. External attributes may also be associated with the content, such as sales popularity, user reviews, publisher promotion, related media, events, etc. The index that catalogs the general library may be organized and presented to the user according to one or more of these attributes.

The user may select the content from this general index of content to be included or otherwise associated in a personalized library for the user. The content in the user's personalized library, or "personal library," is electronically-searchable in all respects, thus enabling the user to search the full text of the content for specified terms (e.g., words, phrases, graphics, charts, pictures, or other text or non-text objects). Depending on access rights and permissions granted to the user, the results of a search may include some, all, or none of the full-text content in which the specified terms are found. Images of one or more pages of content that include the search terms are delivered by the search server 108 to the user device 102, 104 for display to the user, e.g., in the form of a Web page, a portable document image, a raster-based image, a vector-based image, etc. Images of content may be stored and delivered in any available image type, including but not limited to .jpg, .gif, and/or .tif formats. The search terms as found in the image display may also be highlighted by the user device 102, 104, as described later herein.

Selection of content to include in a user's personal library can be accomplished in a variety of ways. For example, a user may manually select content from a general library of content in a manner that positively identifies the content that the user desires to include in his or her personal library. Automated selection of content based on user actions may also be provided. For example, each time the user selects particular content for purchase, that content may automatically be added to the user's personal library. Similarly, a purchase history received from one or more sources may be used to automatically add content to the user's personal library.

As will be discussed below, a personal library enables a user to define and search a particular set of content. Preferably, the user establishes a personal library prior to executing a search so that the search algorithm has a limited universe of content on which to act. In other circumstances, a personal library may be established in real time with the submission or execution of a search query or after the search has been executed on some broader library to define the scope of search results that are presented to the user.

Figure 2:
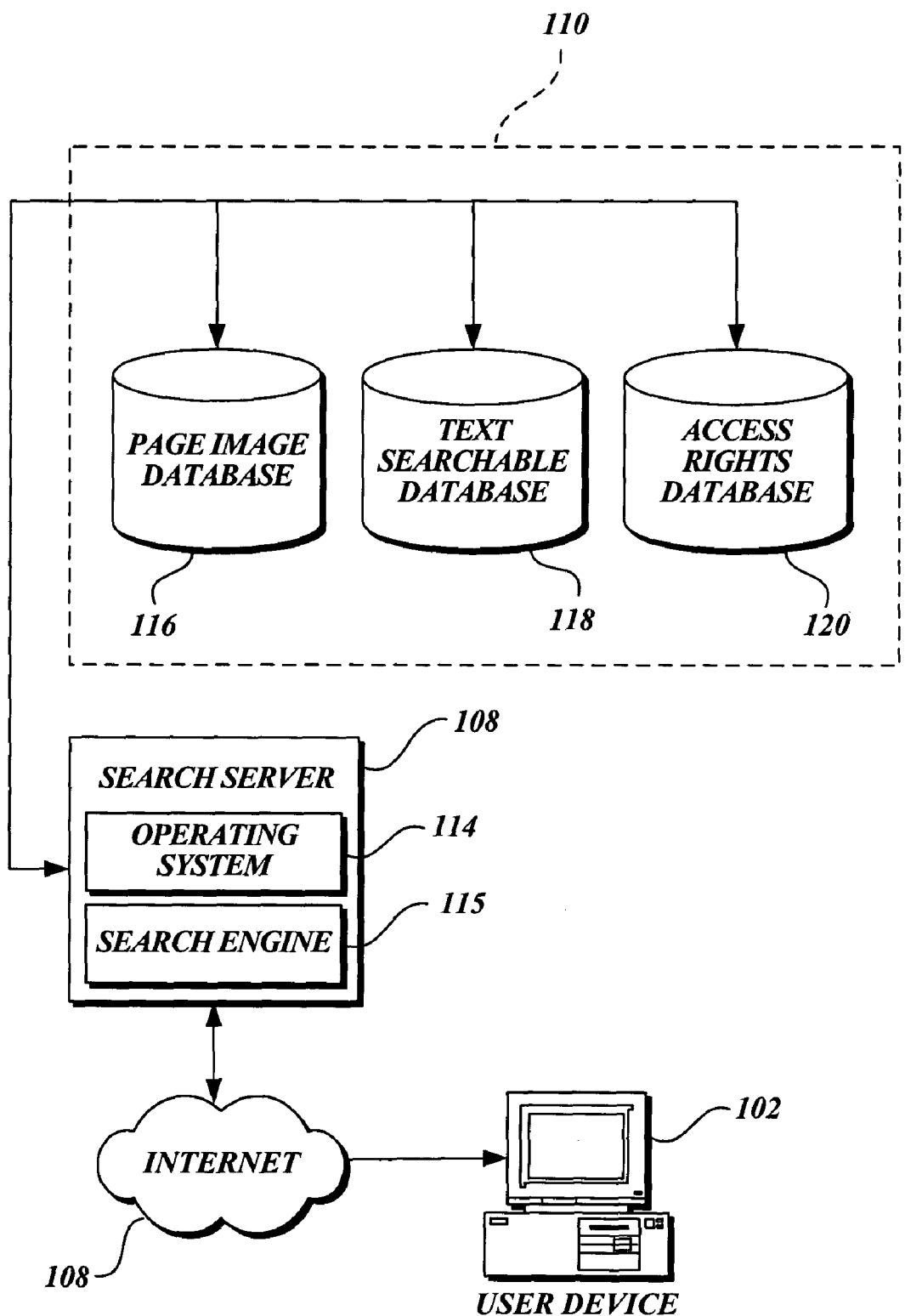
FIG. 2 is a block diagram depicting an arrangement of certain computing components for implementing the embodiment shown in FIG. 1.

FIG. 2 illustrates certain exemplary computing components that are responsible for the operation of the library content search system 100 shown in FIG. 1. The search server 108, for example, is shown including an operating system 114 that provides executable program instructions for the general administration and operation of the search server 108. The search server 108 further includes computer program instructions for implementing a search engine 115 that operates in cooperation with the database server 110 to respond to user search queries. Suitable implementations for the operating system 114 and algorithms for the search engine 115 are known or commercially available, and are readily implemented by persons having ordinary skill in the art, particularly in light of the disclosure herein.

The database server 110, as illustrated in FIG. 2, includes a page image database 116, a text searchable database 118, and an access rights database 120. The database server 110 is configured to receive search instructions from the search engine 115 and return search results from the page image database 116 and/or text searchable database 118. The access rights database 120 enables the search server 108 to control the scope and nature of the content that can be displayed to the user as a result of a search. For example, a user may be permitted to view an entire image of a page of content, such as a book, that the user already owns. For content not owned by the user, the user may be permitted to view only a selected portion of the page image located by the search, with the remaining portions of the page image being suppressed. Those of ordinary skill in the art will recognize that the search server 108 and database server 110 will typically employ a memory and main processor in which program instructions are stored and executed for operation of the servers. The database server 110 further includes executable program instructions for maintaining and updating the databases 116, 118, and 120, and responding to search instructions received from the search engine 115.

For the sake of convenience, much of the description herein is provided in the context of searching the content of books, but it should be well understood that the description herein is also applicable to searching a library containing other forms of content that can be read and displayed to a user. References herein to specific types of content, such as books, magazines, newspapers, etc., are only illustrative and do not serve to limit the general application of the invention.

As discussed, a library of content may be personalized by a user to include only such content as selected by the user, either manually or automatically as a result of one or more user actions. In order to provide content that the user can select to include in his or her personal library, it is appropriate (though not required) to first create a general library of content. In one implementation discussed herein, libraries of content include both images of pages of content, as well as text searchable forms of the content. Page images are stored in the page image database 116, while searchable text corresponding to the page images is stored in the text searchable database 118. Further implementations may allow a user to upload and store page images that are specific to the user's personal library. When permissible, the user may also add the uploaded content to the general library of content for selection by other users.

Figure 3:
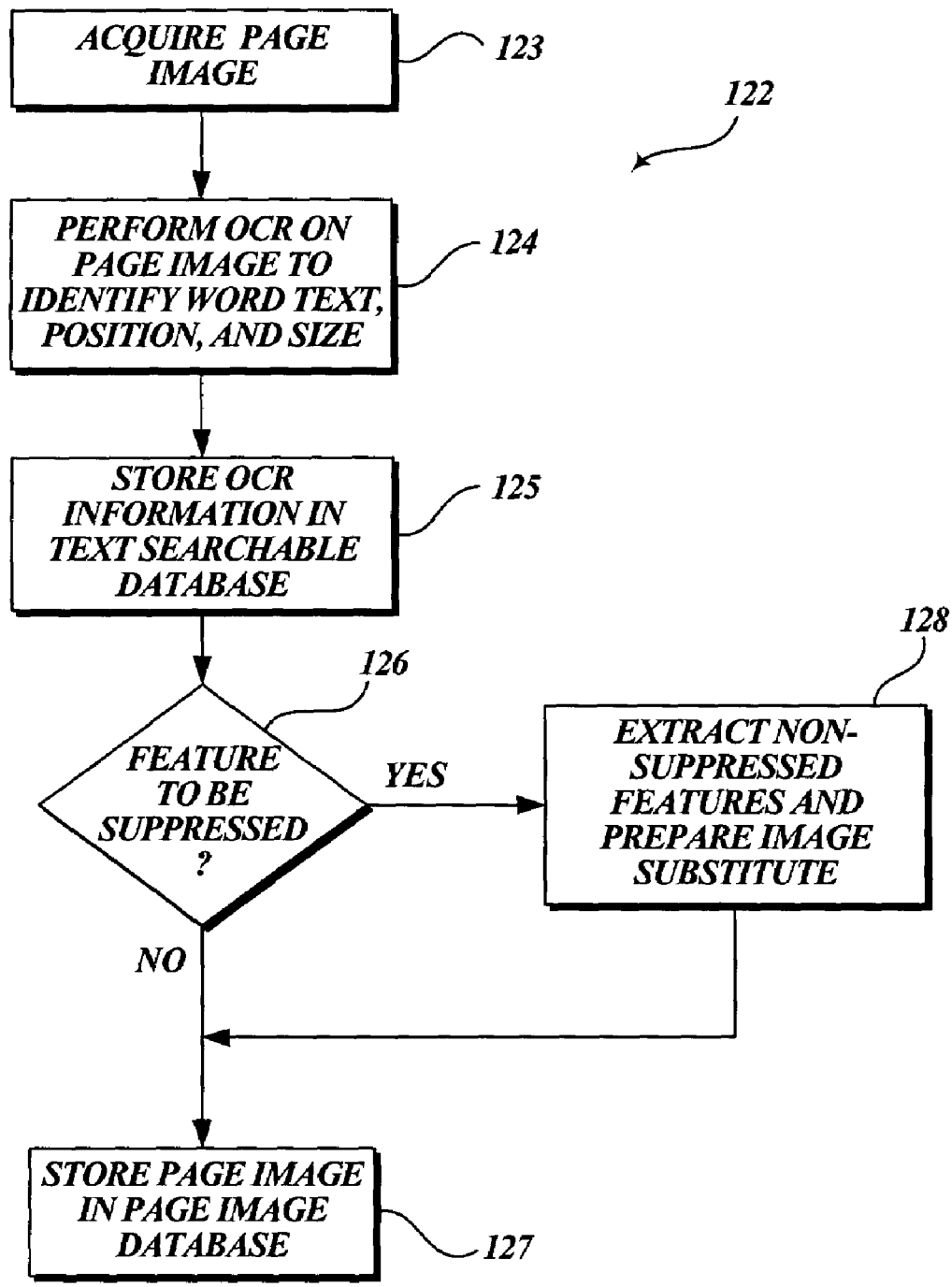
FIG. 3 is a flow diagram describing one embodiment of a process for preparing images of content and storing the images in a page image database, along with preparing and storing text of the content in a text searchable database.

One embodiment of a process 122 by which pages of content can be prepared and stored in the databases 116 and 118 is shown in FIG. 3. For each page of content to be included in the general library (from which different users' personal libraries may be defined) or in a user's personal library, images of each page of the content are acquired, as indicated at block 123. Image acquisition can be performed using methods known in the art, such as scanning printed pages into an electronic image format, converting electronic text to an electronic image format images, retrieving page images that have previously been stored in memory, etc.

For each page of content, a recognition routine, such as an optical character recognition (OCR), may be performed on the page image as necessary to identify the text, position, and size of each word on the page, as indicated in block 124. It should also be understood that a "word" encompasses any grouping of one or more characters, numbers, or symbols, and may stand alone or be associated with a non-text object, such as a picture or graphic. OCR routines are well known in the art of electronic document processing and do not require further discussion herein. As indicated at block 125, the resulting text, position, and size information obtained from each page image is preferably stored in the text searchable database 118.

The text searchable database 118 may be organized as desired, preferably using data structures optimized for full text searching. In one suitable embodiment, each word in the text searchable database 118 has associated therewith content identification numbers (e.g., SKU numbers) and page numbers corresponding to images in the page image database 116 where the particular word is found. Furthermore, in association with each page image number, the text searchable database 118 preferably includes information that identifies the position and size of the text (and possibly non-text objects associated with the text) as found on the respective page image. In one implementation, the position and size information is recorded as "quads," which include four numbers representing the X and Y position and the width and height of the text as it appears on a particular page image. All of this information may be heavily encoded in the text searchable database 118 to reduce the storage space required.

A general library of content or personal library of content may be configured to include only that content for which the library owner has obtained valid rights to store, reproduce and distribute the content. Situations may arise in which a publisher of a book, for example, grants rights to a library owner to store and reproduce certain features as found in a book, but restricts the reproduction of one or more other features in the book, e.g., for copyright or contractual reasons. Such features may include, for example, photographs, graphics, charts, names, numbers, dates, formulae, equations, pictures, and other text or non-text objects, or portions thereof. Features on a page image may also be identified by characteristics such as size, font, and/or location on the page image. Features may thus be treated differently for suppression, even though the features may have similarities, such as having identical text but are located at different places on the page image. In this manner, an implementation of the invention may suppress all features on a page image, for example, except those features located adjacent to located search terms. For whatever reason the case may be, the present invention provides a process by which features in a page image can be identified and suppressed so that when the page image is displayed to a user (e.g., as a result of a search), only the non-suppressed features of the page image are displayed.

At decision block 126 in FIG. 3, the process 122 determines for a page image whether the page has one or more features to be suppressed. If no features need to be suppressed, the originally-acquired page image is stored in the page image database 116, as indicated at block 127, for later retrieval.

On the other hand, if one or more features in a page image are to be suppressed, the process 122 proceeds to extract the non-suppressed features in the page image, as indicated at block 128, in order to prepare a substitute image that omits the features to be suppressed. One example of feature extraction in this regard is described in reference to FIGS. 4–6. The resulting substitute page image is then stored in the page image database 116 in place of the originally-acquired page image, as indicated at block 127. In some circumstances, the initial page image may be separately stored in anticipation of later receiving rights to reproduce more or all of the initial page, including previously suppressed features. Alternatively, it may be permitted to store a "negative" version of the page image in which the non-suppressed features are removed, but all else (including the suppressed features) remains. The initial page image can be restored in this alternative case by combining both the "positive" and "negative" versions of the page image.

After identifying features in a page image, one or more suppression criteria (or non-suppression criteria) may be used to help designate the features that are to be suppressed (or not to be suppressed). For example, in the context of a user-initiated search, a non-suppression criterion may include the search terms used by the user in the search query. Features, such as text, that match the search terms are thus designated to not be suppressed. Adjacent features, such as text, that are within a certain proximity to the search terms, may also be designated for non-suppression. Adjacency, in this regard, may be measured in number of words or in distance from the search terms, for example. Suppression or non-suppression criteria may be content-specific, such as designating for suppression all numbers in an equation or all numbers in a block of text identified as a recipe, examples of such will be further discussed below. In addition, determining location and size information for features in a page image that meet suppression (or non-suppression) criteria is helpful when preparing a substitute page image that includes only the non-suppressed features. Suppression (or non-suppression) criteria may also be used to identify and designate non-text objects, such as photographs or pictures. A non-text object may have text associated therewith, and the non-text object meets the suppression (or non-suppression) criteria by reference to the object's associated text. For example, a suppression criterion may dictate that all photographs attributed to a certain source are to be suppressed. Photographs with attribution text that meet the suppression criterion are thus designated to be suppressed, and location and size information for the photographs may be obtained for purposes of suppressing the photographs.

Figure 4:
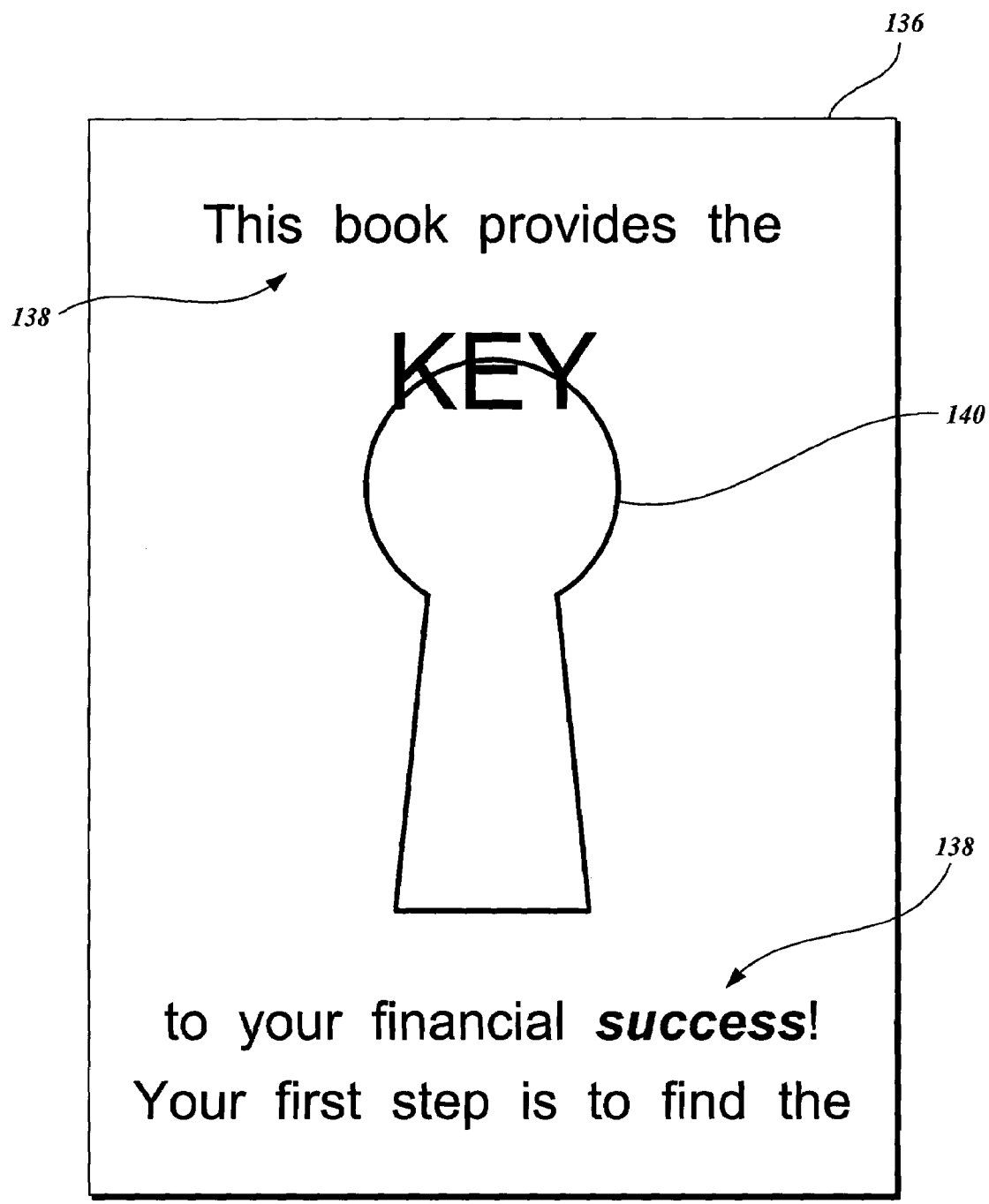
FIG. 4 is an example illustration of a page of content with text and a picture.
Figure 5:
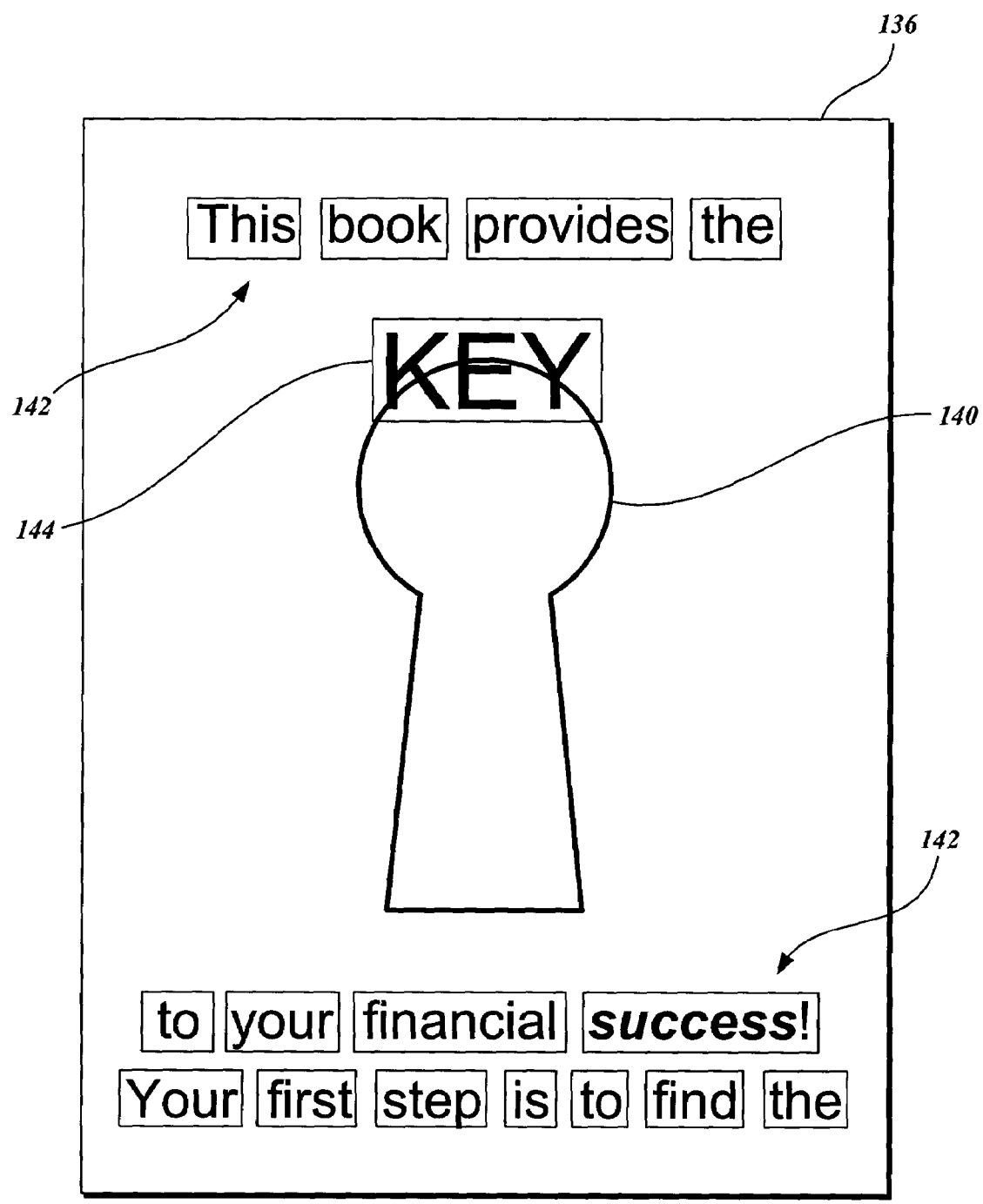
FIG. 5 illustrates the page shown in FIG. 4 with identified text shown in boxes.
Figure 6:
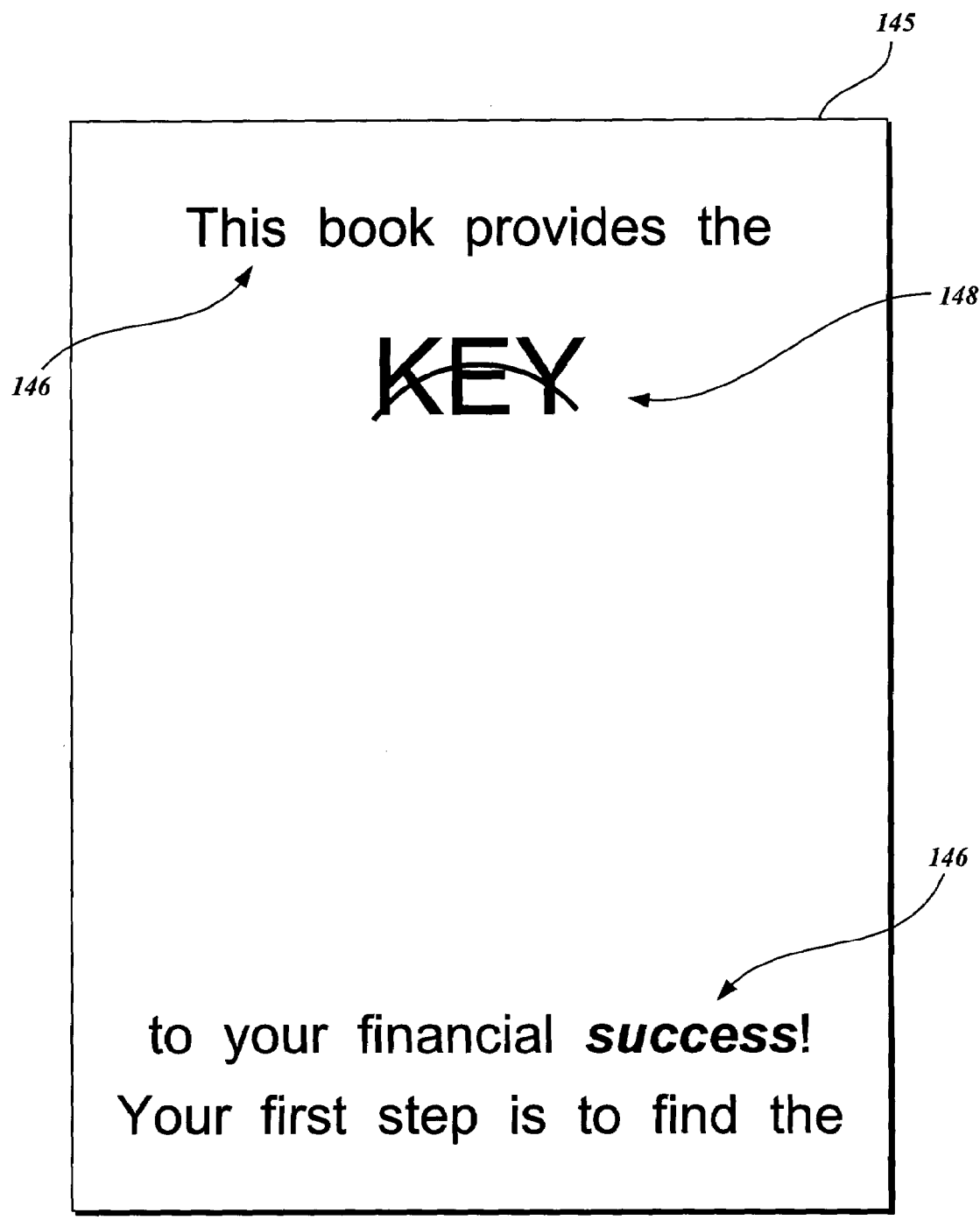
FIG. 6 illustrates a substitute page in which images of the text identified in FIG. 5 are copied and placed in the substitute page, thus effectively suppressing the picture in the original page shown in FIG. 4.

FIGS. 4–6 illustrate one exemplary process by which a feature (here, a picture) in a page image can be suppressed. FIG. 4 depicts a page image 136 that includes both text 138 and a picture 140. A first task in this process is to identify each non-suppressed feature (here, each word) on the page image 136, as well as the location and size of each non-suppressed feature. Conveniently, where words are the non-suppressed features, this can be achieved as part of the OCR process described earlier with respect to block 124 in FIG. 3. OCR approximation can also be used in this regard, which is often faster and can be conducted in real time as opposed to typical OCR where each character of each word is independently and correctly recognized. OCR approximation returns the location and size of words, but does not necessarily recognize each individual character correctly. FIG. 5 illustrates the page image 136 in which each of the words on the page have been located and identified, as represented by the boxes surrounding each word indicated by reference numeral 142. The word indicated at numeral 144 has also been located and identified, but the word 144 is separately noted herein because the background of the word includes a small portion of the picture 140.

Turning to FIG. 6, a substitute image 145 for the page image 136 is prepared by generating a blank image and then copying information for each identified word, such as pixel information, from the original page image 136 to the substitute image 145, as indicated generally by reference numeral 146. The words are placed on the substitute image 145 at the respective corresponding location that each word is found in the original image 136. By "cutting" only the pixel information for each word as contained in the boxes surrounding the words in FIG. 5, and "pasting" the pixel information in the substitute image 145, the picture 140 in the original image 136 is effectively suppressed. When the pixel information for the word image 144 is copied into the substitute image 145, as shown at reference numeral 148, the small part of the picture behind the word 148 may remain visible in the substitute image 145, though the picture 140 as a whole cannot be recognized. If desired, algorithms known in the art may be applied to the word image 144 to eliminate the background behind the letters. In any case, the amount of the picture 140 behind the word 148 represents only a small fraction of the original picture 140. In an alternative embodiment, a substitute image that suppresses a picture may be prepared by first identifying words in the original page image 136, e.g., as shown in FIG. 5, and then "erasing", or removing, all the pixel information in the page image that fails to correspond to the identified words (i.e., outside the "boxes" that surround the identified words). The result is a substitute page image that appears the same as the result of cutting and pasting the non-suppressed word images into a new (substitute) page image. Similarly, the feature suppression may entail identifying features to be suppressed in the original image 136, such as the picture 140, and removing the pixel information corresponding to the features to be suppressed (except, perhaps, where overlap with non-suppressed features occurs, e.g., word image 144), leaving behind the non-suppressed features in the page image.

In some cases, the original page image 136 may have a background texture or color that is desired to be reproduced in the substitute image 145. One suitable method for preparing a substitute image 145 with a background similar to that of the original image 136 is to inspect one or more pixels in one or more corners of the original image 136 and duplicate the color and intensity of those pixels in the respective corners of the substitute page 145. The color and intensity from each corner may then be interpolated inward to the center of the page to complete a background for the substitute page 145 that simulates the background of the original image 136. In the alternate embodiment above, where pixel information outside the "boxes" is "erased," the pixel information may be differentiated between foreground pixel information and background pixel information with only the foreground pixel information being erased, leaving the background information in its place. A further alternative embodiment is one in which features to be suppressed are identified and the pixel information for those features is "erased" (e.g., by replacing the pixel information with background pixel information), leaving the non-suppressed features in place.

Feature suppression can vary depending on the type of content involved and the restrictions imposed. For example, a publisher of a recipe book may allow an ingredient list for a recipe to be shown to a user but not the amount of ingredients. Using OCR techniques, numbers such as "5" and "five," for example, can be identified and suppressed, as well as fractions, using one of the feature suppression methods described above. Allowing a user to see an ingredient list (and perhaps the cooking instructions) allows the user to identify desirable recipes. The user may then seek to acquire the entire recipe, e.g., by electronic download or printed recipe book purchase. Similar procedures may be used by publishers of technical treatises or texts where numbers and/or equations are central operative features of the texts. Although the numbers and equations may be suppressed, the user is afforded an opportunity to view surrounding text and at the same time may be invited to purchase the text to view the operative numbers or equations. In essence, the present invention permits different classes of information to be suppressed from the page images that are stored in the page image database 116 and/or shown to the user. Suppression of a picture, as illustrated in FIGS. 4–6, is just one example of a class of information capable of suppression.

Feature suppression can be performed at any stage after a page image has been initially acquired and before the page image is displayed to a user. The process 122 shown in FIG. 3 depicts feature suppression before a substitute page image is stored in the page image database 1118. The substitute page image is then available for retrieval and immediate display to multiple users without having to implement a feature suppression process individually for each user. FIG. 3 thus depicts a "universal" feature suppression that does not differentiate between users to whom the page image is to be shown.

Alternatively, feature suppression may be dynamically performed on an initial page image or a previously-prepared substitute page image, e.g., after the page image has been retrieved from the page image database 118. Dynamic feature suppression can be performed in real time when a user selects a search result for viewing. The page image(s) corresponding to the selected search result are retrieved from the page image database 118 and one or more of the feature suppression methods discussed herein are executed on the retrieved page image to produce a feature-suppressed image that is delivered to the user for viewing. Dynamic feature suppression enables the library content search system 100 to differentiate between users and their respective rights to access the content in the page image database 116. The access rights database 120 may include access rules that define different access limitations based on access criteria, such as the particular user seeking access, the particular content the user wishes to view, the time and/or location at which the user wishes to view the content, user-ownership of the content, and special authorization presented by the user. In regard to the latter, an authorization to view content received from a user may be subject to an authentication method known in the art to confirm validity of the authorization. Such authorization may result in the access rules being applied differently to the authorized user and allow access to a greater amount of content than would otherwise be allowed. For example, a student may receive an authorization to view the content of a book during a particular course, with the authorization expiring after the course is concluded. Other circumstances in which a user may receive and present an authorization to view normally-suppressed content can be readily appreciated in light of the present disclosure.

Moreover, an embodiment of the invention may implement a combination of the above. For example, a publisher may restrict certain features from being shown to any user. In that regard, feature suppression is preferably performed on the initial page image and the feature-suppressed (substitute) page image is stored in the page image database 118 for later retrieval. Additional dynamic viewing limitations may then be imposed on the stored (substitute) page image when it is retrieved from the page image database 118 using a feature suppression method described herein.

Figure 7:
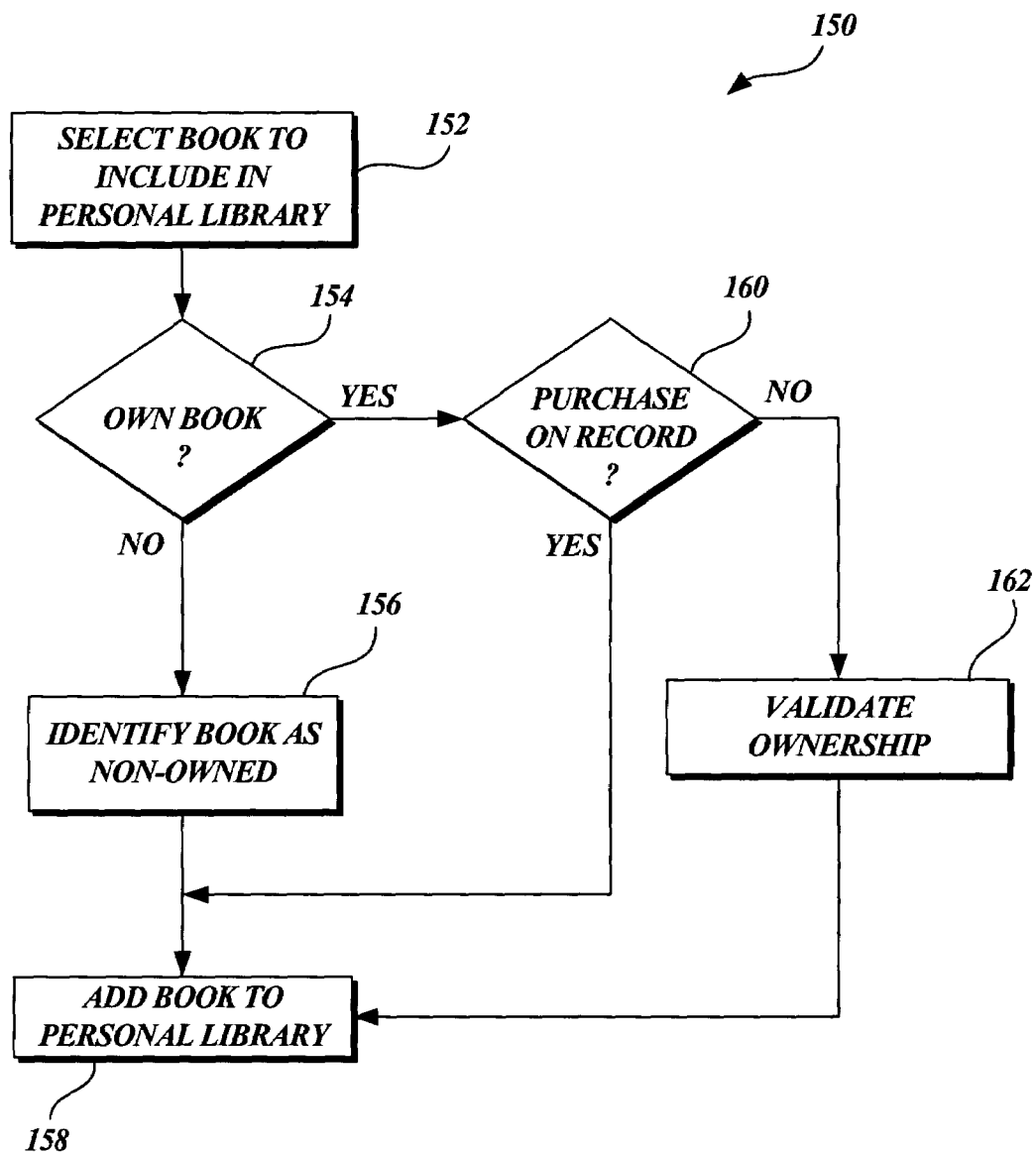
FIG. 7 is a flow diagram describing one embodiment of a process that enables a user to select and add content to be included in the user's personalized library.

Turning now to FIG. 7, a process 150 is described by which a user may establish or update a personal library of content that is selected from a general library of content, as stored in a page image database 116 and text searchable database 118. As a first step 152 in the process 150, the user selects content from the general library and includes this content (or electronic link thereto) in the user's personal library. By way of example only, the content described in FIG. 7 is in the form of a book, though the invention applies to other forms of content. As discussed earlier, in one embodiment, user-selection of content for a personal library may be accomplished by permitting the user to review an index of the content in the general library and manually select particular content (in this example, a book) to include in the user's personal library. For each selection at block 152, the process 150 determines at a decision block 154 whether the user owns the book. If the user does not own the book, the particular book is identified as non-owned by the user, as indicated at block 156, and added to the user's personal library, as indicated at block 158. Non-ownership of a book in a user's personal library may be indicated by an electronic flag associated with the book in the personal library.

Returning to decision block 154, if the user indicates that he or she owns the book, the process 150 attempts to confirm the user's ownership. In circumstances where the personal library searching service is provided by an entity that sells books, the entity may review its purchase information for the user to confirm that, in fact, the user owns the book, as indicated at reference numeral 160. The personal library searching service may also have partner agreements with other booksellers that can confirm purchase records for a user. Reviewing the user's purchase records may further be done automatically for books selected by the user in block 152, without querying the user whether he or she owns the book. Alternatively, a user's selection of a book for purchase may act to automatically add the book to the user's personal library. In any regard, if the user's purchase of the book is confirmed, the process 150 proceeds to add the book to the user's personal library, as indicated at block 158. A flag may be associated with the book in the personal library to indicate that ownership of the book has been confirmed.

If ownership of the book cannot be confirmed by reference to a purchase record or other data source for validation of ownership, the process 150 may ask the user to undergo additional steps to validate ownership of the book, as indicated at block 162. The user, for example, may be asked to submit copies of receipts evidencing purchase of the selected book. Alternatively, or in addition, the user may be asked to provide an image of one or more pages from the selected book to validate ownership of the book. In some circumstances, it may be sufficient for the user to indicate the party from whom the book was purchased, and the provider of the personal library searching service can independently confirm with the identified seller that in fact a purchase of the book had been made. A determination of ownership of content selected for a personal library is not critical or necessary to the invention, but is helpful in circumstances where the amount and scope of content displayed to a user in a search is restricted in accordance with established ownership of the content.

As noted earlier, the database server 110 may include an access rights database 120 that controls the scope and nature of the content that is displayed to a user as a result of a search. The access rights database 120 includes access rules that, when determined to be applicable, act to limit the content in the page images that are shown to the user. Limitations on viewing content may be established for each individual user (or groups or types of users), and may include, but are not limited to, one or more of the following: limits on the amount (e.g., percentage) of content that can be shown to the user for any given page, title, or collection of content, limits on the total number of pages that can be shown for any given title or collection content, limits on the amount of content based on type of content, limits on the total number of pages that can be shown to a user independent of content-specific limitations, and limits on the total number of pages that can be shown to the user for any given search result. These limits may be imposed on a per search basis or in the aggregate for all of the searches conducted by the user. These limits may also be imposed for specified time periods. For example, access rules may be written such that a user may not see more than a specified percentage of a given page of content in a specified time frame, such as a 30-day time period, or 10 days in a 30-day cycle, or over the lifetime of the user. The library content search system 100 may implement user verification procedures to inhibit users from establishing multiple accounts to circumvent access limitations in the access rights database 120. The search system 100 may also be set up to permit users to view content that is located only as a result of a search. In other words, the user is not permitted to access and view arbitrary pages, for example, in a browse mode (though the user may be able to browse one or more pages adjacent a page located in a search to give context to the located page). To carry out limitations such as these, the search system 100 may be configured to track user activity for each user, including the identity of the page images (or portions thereof) that the user has viewed and the time frame in which the user has viewed the page images.

Access rules in the access rights database 120 may further be configured to apply differently for each individual user (or groups of users) depending on content-specific information, such as the type of content at issue. For example, access rules may be written to permit unlimited viewing of tables of content and indexes of content but impose stricter limitations on viewing the body of the content itself.

User location can also act as a factor that determines which access rules govern a user's access to content at the time the content is produced for display to the user. For instance, different access rules may be written to enable a student in a classroom to access an entire body of content that is being used in the class, while the same student, at home, is only able to view a limited portion of the content. The domain of computer connection, for example, may be used to determine user location. Access rules may be written to apply differently based on the time the content is to be provided to the user, e.g., on different days or at different times of day, as well. Access rules may also be prepared and stored in the access rights database 120 so that once a portion of a page image has been displayed to a user, the user can always come back to view that portion, without impacting other limits on viewing new page images.

Feature suppression methods provided by the present invention can be used to implement the access restrictions imposed by the access rules in the access rights database 120. For example, an access rule may be written such that, when the rule is determined to apply, the rule limits the amount of content in the page image to be displayed to the user. Features in those portions of the page image that are not to be displayed to the user are designated for suppression. Alternatively, features in those portions of the page image to be shown to the user are designated not to be suppressed. Using one or more of the feature suppression methods described herein, a substitute page image containing the non-suppressed features and omitting the suppressed features can be generated and provided to the user.

The personal libraries of users need not duplicate the actual content stored in the general library. Rather, each user's personal library may be comprised of a listing of the content that the user has selected from the general library to include in his or her personal library. This personal listing of content may link to the actual content stored in the database server 110. By limiting the number of actual copies of the content in the database server 110, and allowing users' personal libraries to link to that content, the amount of storage space required for implementing a personal library searching service is reduced. Furthermore, providing a general library of content that is publicly accessible to users for defining personal libraries reduces or removes from users the burden of scanning content and creating searchable electronic copies of content for their personal libraries, not to mention obtaining legal clearance to produce copies of content, where such is necessary.

A user that has established and/or updated a personal library is able to electronically search the personal library, e.g., for content having text that matches one or more search terms provided by the user. A search conducted in this manner has significant advantages including (1) limiting the user's search to the particular content in the user's personal library; (2) conducting a full text search that encompasses the entire body of content in the user's personal library which is more comprehensive than a search encompassing only bibliographic and abstract data or metadata associated with the content; and (3) producing for immediate review by the user the actual images or portions of images of content resulting from the search. Additional advantages are evident from the description herein.

Figure 8:
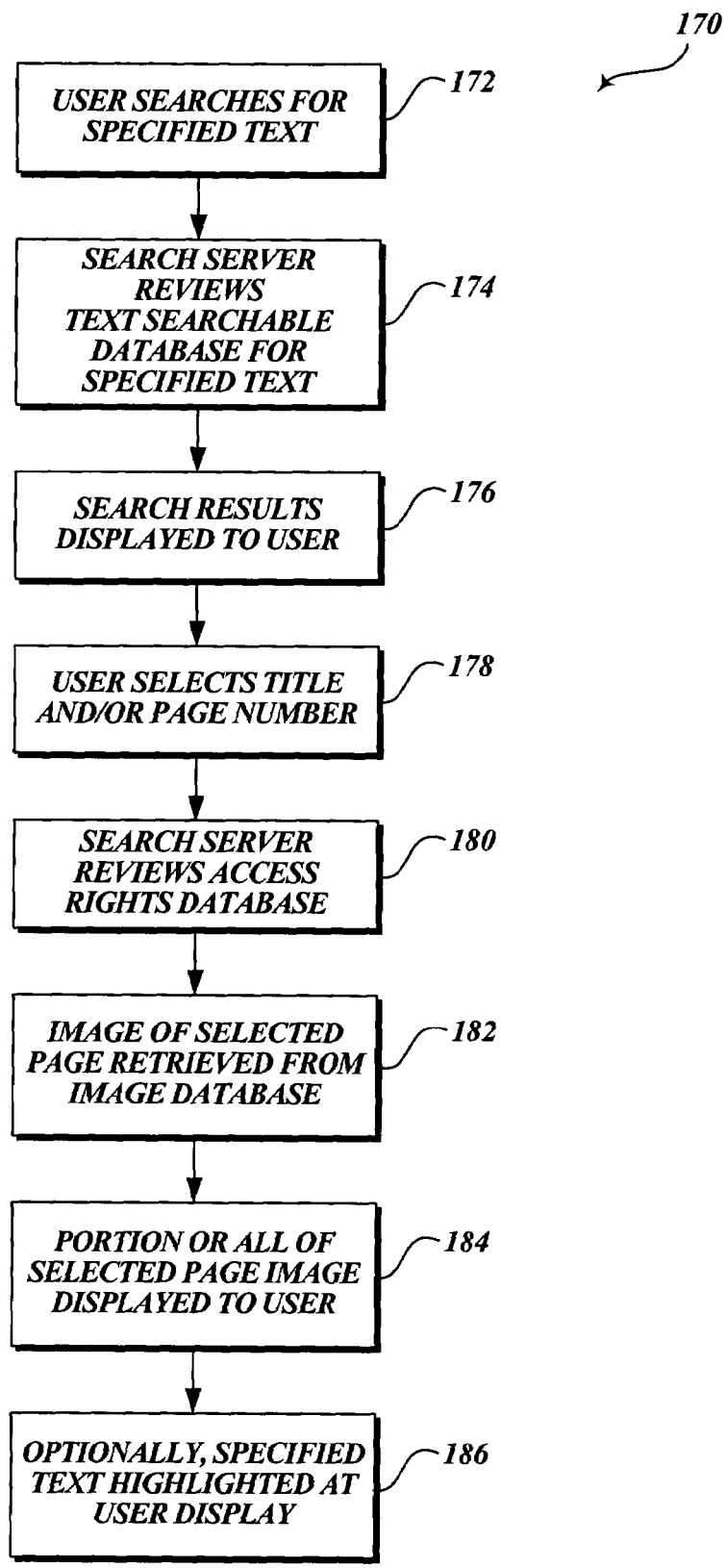
FIG. 8 is a flow diagram describing one embodiment of a process for searching and displaying content in the user's personalized library.
Figure 9:
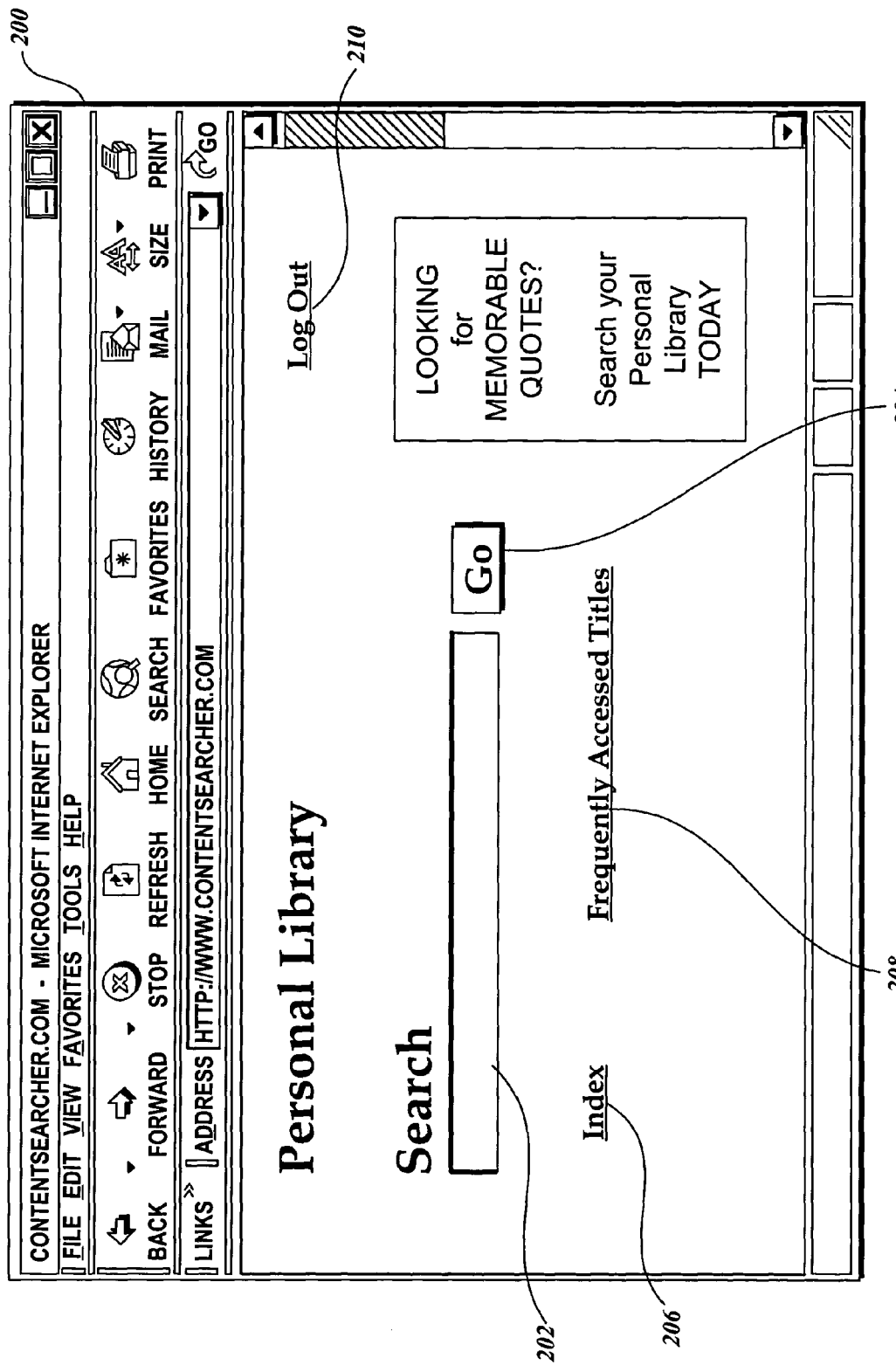
FIG. 9 depicts a browser program with an example Web page presenting a search input field to a user.

One embodiment of a process 170 for searching and viewing content in a personal library is described in reference to FIG. 8, with further reference to FIGS. 9–12. In FIG. 8, at block 172, a user initiates a search for specified text in the content in the user's personal library. In a Web-based implementation, one example of a Web page provided to the user for searching a personal library is illustrated in FIG. 9.

FIG. 9 illustrates a browser program 200 displaying a Web page in which the user is able to enter one or more search terms in a search entry box 202. The Web page may be generated by the search server 108 and delivered to the user's computing device 102, 104 via the Internet. The user enters the desired search terms in the box 202 and uses a pointing device, keyboard, or other input device to initiate the search, e.g., by clicking on the button "GO" identified at reference numeral 204. The Web page in FIG. 9 may include other hypertext links, such as an "Index" link 206 and "Frequently Accessed Titles" link 208, both providing additional information that can be assembled into one or more additional Web pages not illustrated. Clicking on the Index link 206 for example, may produce a Web page for the user that lists bibliographic data for all of the content presently included in the user's personal library. The Frequently Accessed Titles link 208 may produce, for example, a listing of the content most frequently accessed by the user.

Log in and log out routines may be employed by the search server 108 to provide users with secure access to their personal libraries. Suitable routines for verifying a user requesting access to a personal library (e.g., using a password) are well known in the art. In FIGS. 9–12, it is assumed the user has already logged in. A Log Out link 210 is illustrated and, when initiated, enables the user to discontinue the user's current session and log out of his or her account.

Returning to FIG. 8, at block 174, the search server 108 receives the user's specified search terms and initiates a search of the text searchable database 118 to identify the pages of content in the user's personal library that include the text of the search query. As noted earlier, the text searchable database 118 is preferably constructed to include information that identifies the corresponding images in the page image database 116 where the search terms can be found. Thus, when conducting a user search for specified terms, the text searchable database 118 not only identifies the particular content in the user's personal library that contains the specified text, but also identifies the corresponding page images in the page image database 116.

Figure 10:
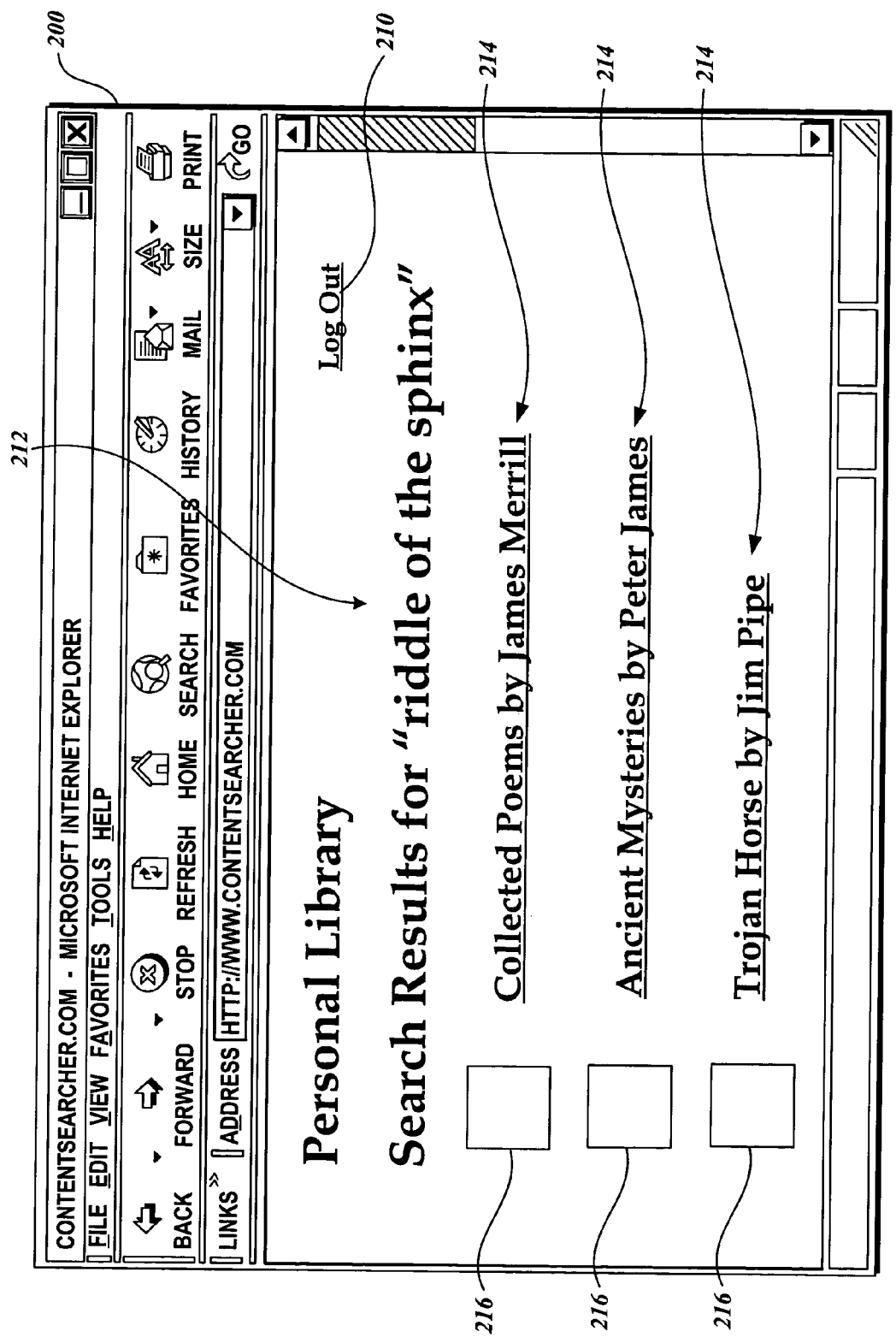
FIG. 10 depicts a browser program with an example Web page presenting results of a sample search.

The results of the user's search performed in block 174 are displayed to the user, as indicated at block 176. FIG. 10 illustrates the browser program 200 displaying a Web page in which search results for a sample phrase "riddle of the sphinx" are shown at reference numeral 212. The search results 212 may be displayed in a variety of different formats. By way of example only, the search results 212 in FIG. 10 include a listing of title and author, as indicated at reference numeral 214, along with thumbnail images of the content, or portion thereof (such as a book cover), as indicated at reference numeral 216. Again, the search results 212 are generated from a search of the content selected by the user to be included in the user's personal library. In cases where there are numerous search "hits" in the user's personal library, the search server 108 may execute program instructions that analyze the hits and rank the "best" pages for display to the user according to a predetermined criterion, such as which pages are most relevant. Measures of relevance, for example, may include which pages have the most hits, which pages have hits in their title, which pages are drawn from best selling texts, etc.

Returning to FIG. 8, at block 178, the user may select particular content in the search results, e.g., identified by title and/or page number, for additional review. The search server 108 may immediately display images of the user-selected content to the user. However, in the embodiment shown in FIG. 8, the search server 108 at block 180 first reviews the access rights database 120 in the database server 110 to determine whether there are any access rules governing how much of, or even if, the content listed in the search results can be displayed to the user. As previously discussed, the access rights database 120 is a repository for rules that control the ability of users to access and view the actual content in the library, e.g., beyond standard bibliographic information.

For instance, as noted earlier, different rules may be written to govern a user's access to content that is already owned by the user, as opposed to content not owned by the user. For user-owned content that is identified in the search results, the user may be permitted to access the entire body of that content including page images that precede or follow the pages on which the user's search terms are located. This includes, for example, operating manuals for products that the user has purchased.

Figure 11:
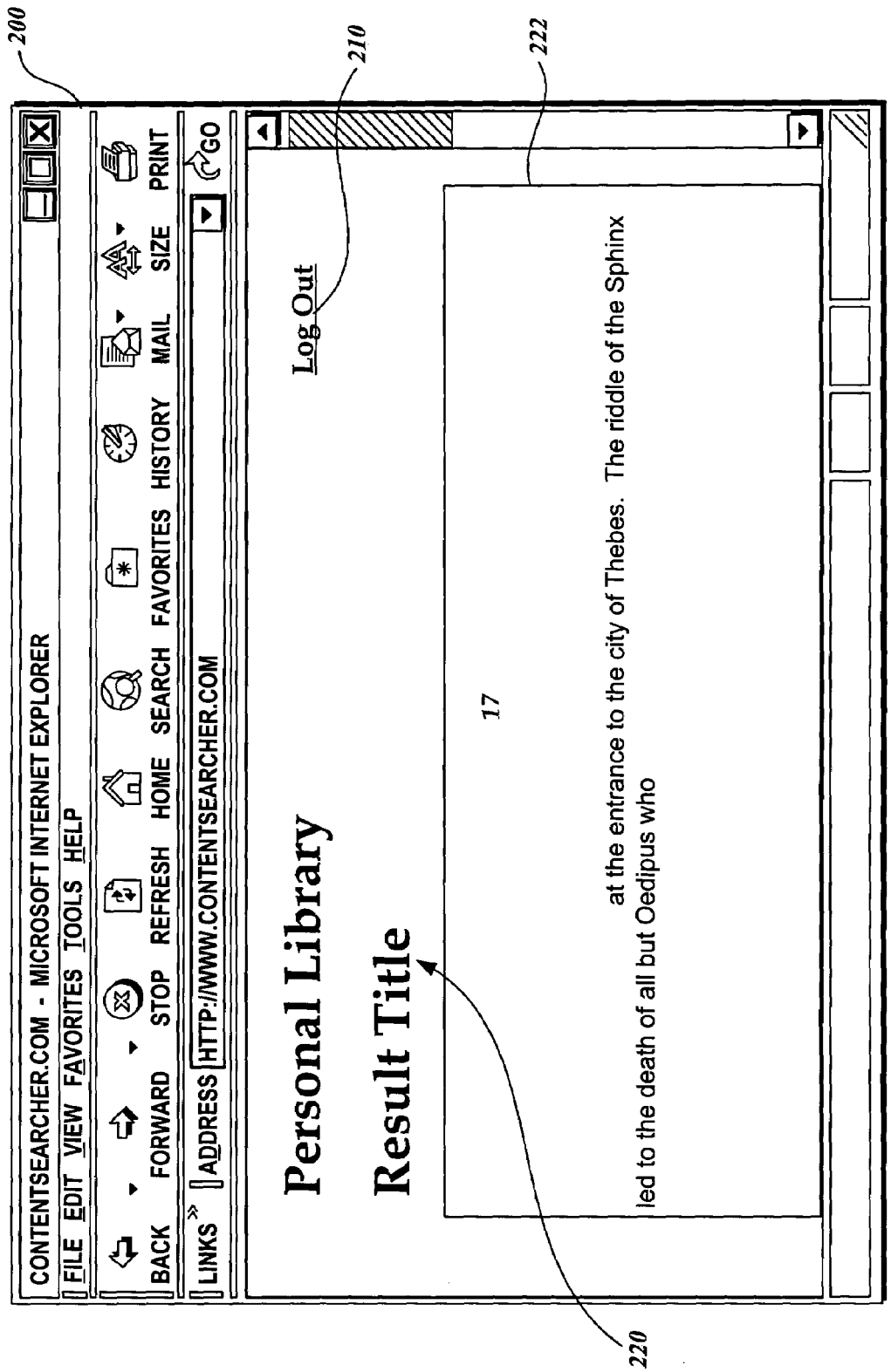
FIG. 11 depicts a browser program with an example Web page showing an image of a page from a selected search result.
Figure 12:
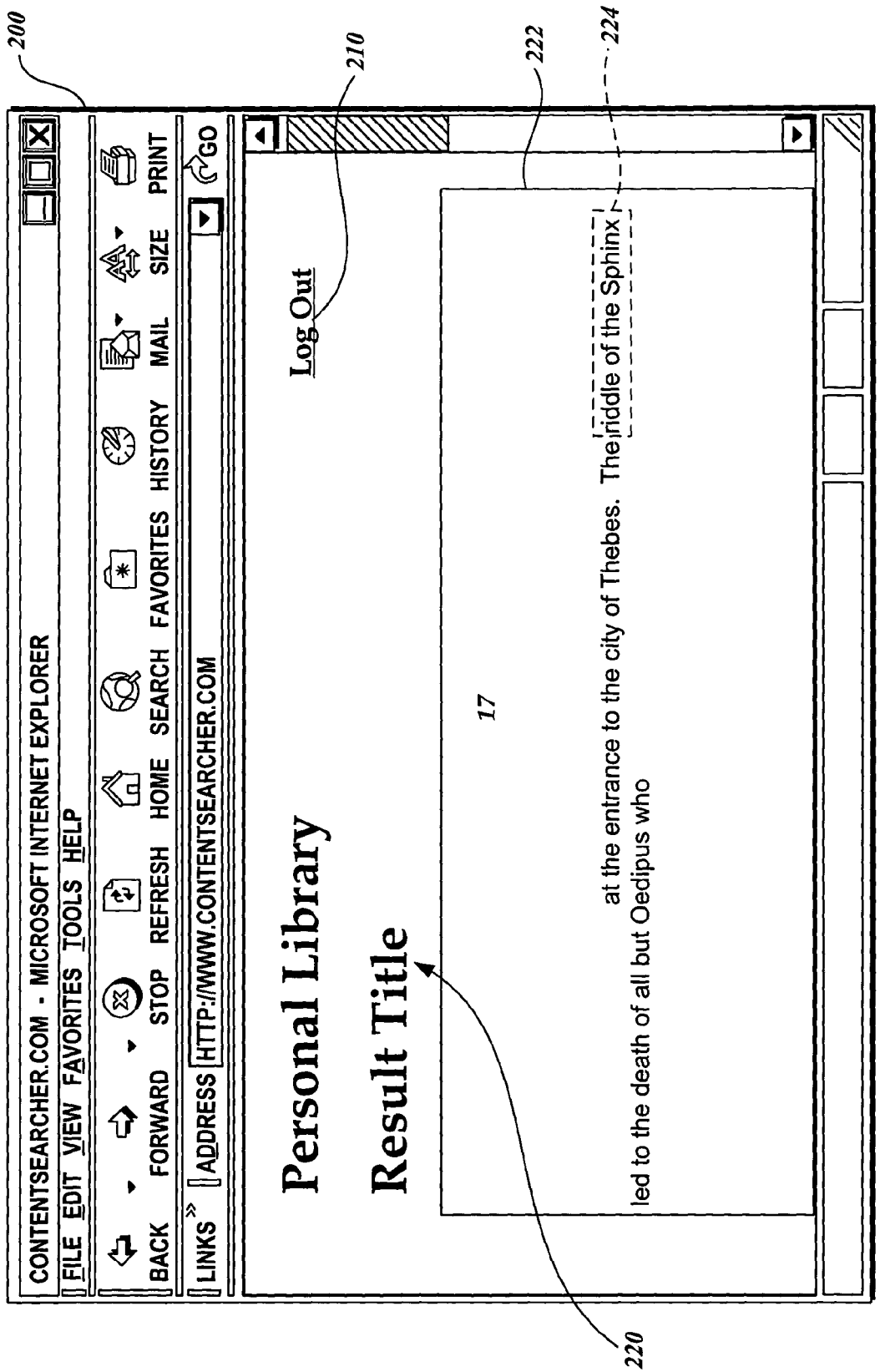
FIG. 12 depicts a browser program with a Web page as shown in FIG. 11 in which the search result is highlighted in accordance with the present invention.

For content that the user does not own, one or more rules in the access rights database 120 may act to limit the amount of content surrounding the located search terms that may be displayed to the user. For example, FIG. 11 illustrates a browser program 200 displaying a Web page for a particular title in the search results previously communicated to the user, such as shown in FIG. 10. The title of the search result, indicated at reference numeral 220, may be any of those in the search results 212, for example.

FIG. 11 depicts a sample page image 222 from the selected result title 220. The page image 222, in this instance, is an image of "page 17" from the result title 220 but does not include all of the content of the original page image. This redaction, or suppression, of content can be the result of a circumstance in which a user has limited access rights to the actual content of the result title 220. In this example, based on a search for the phrase "riddle of the sphinx" as shown in FIG. 10, the resulting page image 222 shows the actual page where the phrase "riddle of the Sphinx" is found, along with a limited number of words preceding and following the search terms. All other words and features on the page image 222, except for the page number, are suppressed. The number of words preceding and following the located search terms may vary according to user preferences and the access rules governing the particular content for the user. In this illustration, nine words are shown preceding and following the phrase "riddle of the Sphinx." In other circumstances, the access rules in the access rights database 120 may permit the user to view a greater portion or even the entire image of "Page 17" (i.e., page image 222) in FIG. 11. Methods for feature suppression as described earlier may be used to suppress content in the page image to be displayed in accordance with the access rules in the access rights database.

In short, returning to FIG. 8, after a user has selected particular content from the search results 212 (block 178)

and the access rights to the content have been considered (block 180), the image of one or more pages with text corresponding to the search terms are retrieved from the page image database (block 182). Based on the access rights granted to the user, a portion or all of a retrieved page image is displayed to the user (block 184).

Optionally, search terms specified by a user may be highlighted in the page images displayed to the user, as indicated at block 186. A process is provided by which search terms may be highlighted in a manner that reduces the time and resources required for delivering the page image to the user for display.

Rather than formatting a page image 222 with highlighting of search terms at the search server 108 and then delivering the highlighted page 222 to the user, the page image 222 may be immediately delivered to the user. In the meantime, the search server 108 determines the position and size of the search terms on the page image 222 (information that may be available in the text searchable database 118 as discussed earlier) and delivers that information to the user. The user device 102, 104 may then locally execute program instructions to place a visual indicator on the page image 222 to highlight the location of the search terms. The visual indicator may be an icon placed next to or an underline placed under the search terms. Alternatively, the visual indicator may be a change of font of the search terms as displayed. In a preferred embodiment, the visual indictor is provided by one or more blocks of transparent color that overlay the search terms, thus creating the effect of a colored highlight 224 (FIG. 12) when the page image 222 is displayed. In the latter preferred embodiment, the user device 102, 104 may be instructed to use DHTML layering or Java script technology to cause the user device 102, 104 to produce the highlight 224 on the page image 222. By having the user device 102, 104 prepare and overlay the color highlight on the search terms, the only information that the search server 108 needs to communicate to the user device 102, 104 (as to highlighting) are the numeric "quads" for each word to be highlighted. As noted earlier, a quad is a set of four numbers that describes the X and Y position as well as width and height of a word on a particular page image. In another embodiment, only the X and Y position of search terms is communicated and a highlight of a standard thickness is layered over the search terms. Minimizing the amount of information that the search server 108 needs to communicate to the user device 102, 104 will reduce the amount of time that it takes to communicate from the search server 108 to the user device 102, 104.

A user's personal library can also be divided as desired into classes of works, such as fiction and nonfiction works, and within such classes, subdivided into subclasses such as mystery, adventure, history, reference, etc. Classes and subclasses of works may be predefined or customized by the user. By restricting searches to particular classes or subclasses of books in the user's personal library, the searches performed by a user may be more focused and helpful to the user. For example, a medical student may define a personal "medical" library in which full text searches of medical texts in the student's personal library are conducted. Furthermore, an algorithm that identifies "related" text may also be used to aid a user's selection of content for the personal library to include content that may not be strictly classified in a particular class but nonetheless be related to a class that the user desires to search. "Related text" algorithms are known in the art and may use dictionary definitions and synonyms of certain words, for example, to identify related content to include in the personalized library that is searched.

The notion of a personal library may be extended from a single person to a small group of persons (constituting a "user"), that know each other and choose to pool the content that they own. A small group of this type may be comprised of family members or persons living in the same apartment or in the same fraternity, etc. Each person in the group can determine the content to be included in the group's personal library. A single searchable set of content is provided to the group. The search results may also be configured to report who in the group owns the book and who currently is in possession of the book.

The description of searching "text" herein may be extended to include searching non-text objects as well, such as pictures, graphs, etc. This can be accomplished by searching data, such as visible or hidden text and/or metadata that is associated with or otherwise describes the object at issue. The text searchable database 118 can be constructed to include such visible or hidden text or metadata, with position and size information pointing to the object in the page image at issue.

While preferred embodiments of the invention have been illustrated and described above, it will be appreciated that various changes can be made therein without departing from the spirit and scope of the invention. The scope of the present invention should thus be determined from the following claims and equivalents thereto.

The embodiments of the invention in which an exclusive property or privilege is claimed are defined as follows:

1. A computer-implemented method for suppressing one or more features in an image of a page of content, comprising:
   (a) acquiring an image of a page of content;
   (b) automatically analyzing the image to identify one or more features in the image of the page of content that are to be suppressed or not to be suppressed, wherein the analysis is performed by a computer process; and
   (c) preparing a substitute image for display that includes one or more portions of the analyzed image having those features that are not to be suppressed.

2. The method of claim 1, in which acquiring an image of a page of content comprises scanning a page of content into an electronic image format.

3. The method of claim 1, in which acquiring an image of a page of content comprises converting electronic text into an electronic image format.

4. The method of claim 1, in which acquiring an image of a page of content comprises retrieving an image of a page of content that was previously stored in a memory.

5. The method of claim 1, in which analyzing the image to identify one or more features that are not to be suppressed includes determining location and size information for the features in the image that meet a non-suppression criterion.

6. The method of claim 5, in which the non-suppression criterion identifies text in the image.

7. The method of claim 6, in which the non-suppression criterion identifies text that matches one or more specified terms.

8. The method of claim 5, in which the non-suppression criterion identifies a non-text object.

9. The method of claim 8, in which the non-text object has text associated therewith and the non-suppression criterion identifies the non-text object by reference to the object's associated text.

10. The method of claim 5, in which preparing a substitute image comprises generating a blank image and using the location and size information to copy to the blank image one or more portions of the analyzed image that include the non-suppressed features.

11. The method of claim 10, in which copying one or more portions of the analyzed image comprises copying pixel information for the non-suppressed features from the analyzed image to the substitute image at one or more locations corresponding to the locations of the non-suppressed features in the analyzed image.

12. The method of claim 5, further comprising including background image information in the substitute image that simulates background information in the analyzed image.

13. The method of claim 12, in which background image information is included in the substitute image by duplicating pixel information from the background of the analyzed image to the background of the substitute image.

14. The method of claim 13, in which background pixel information from one or more locations in the analyzed image is duplicated at corresponding locations in the substitute image and interpolated through the remainder of the substitute image to produce the background image information for the substitute image.

15. The method of claim 1, in which preparing a substitute image comprises removing image information from the analyzed image that fails to correspond to the features that are not to be suppressed.

16. The method of claim 1, in which preparing a substitute image comprises removing image information from the analyzed image that corresponds to the features that are to be suppressed.

17. The method of claim 1, in which analyzing the image to identify one or more features that are to be suppressed includes determining location and size information for the features in the analyzed image that meet a suppression criterion.

18. The method of claim 17, in which the suppression criterion identifies text in the analyzed image.

19. The method of claim 18, in which the suppression criterion identifies text that does not match one or more specified terms.

20. The method of claim 17, in which the suppression criterion identifies a non-text object.

21. The method of claim 20, in which the non-text object has text associated therewith and the suppression criterion identifies the non-text object by reference to the object's associated text.

22. The method of claim 1, further comprising including background image information in the substitute image by duplicating pixel information from the background of the analyzed image to the background of the substitute image.

23. The method of claim 1, further comprising including background image information in the substitute image by differentiating foreground pixel information from background pixel information, and removing foreground pixel information from the substitute image that corresponds to the features to be suppressed.

24. The method of claim 1, further comprising storing the substitute image in a database for later retrieval.

25. The method of claim 24, in which a stored substitute image, when retrieved, is subject to further feature suppression by (1) analyzing the image to identify one or more features in the image that are to be suppressed or not to be suppressed, and (2) preparing a substitute image that includes one or more portions of the analyzed image having those features that are not to be suppressed.

26. The method of claim 1, further comprising referring to an access rule that limits the content that can be included in the substitute image, and analyzing the image of the page of content to identify the one or more features in the analyzed image that can be included in the substitute image in accordance with the access rule.

27. The method of claim 26, in which analyzing the image to identify the one or more features that can be included in the substitute image includes determining location and size information of the features.

28. The method of claim 27, in which preparing a substitute image comprises generating a blank image and using the location and size information to copy pixel information for the features that can be included into the substitute image at the same locations as in the analyzed image.

29. The method of claim 26, in which the access rule defines an aggregate amount of content that can be included in the substitute image.

30. The method of claim 26, in which the access rule defines a percentage of content that can be included in the substitute image.

31. The method of claim 26, in which the access rule defines an amount of content that can be included based on content-specific information.

32. The method of claim 26, in which the access rule defines an amount of content that can be included based on content ownership.

33. The method of claim 26, further comprising referring to different access rules based on a location of a user.

34. The method of claim 26, further comprising referring to different access rules based on a time at which the substitute image is to be provided to a user.

35. A computer system that provides an image of a page of content to a user as a result of a search, comprising a search server in communication with a database server, in which the database server is configured with a library of content that includes (1) an image database containing images of pages of content and (2) a text searchable database containing text and information identifying the images in the image database that contain the text, the search server being configured with computer-implemented instructions that enable the search server to retrieve an image of a page of content from the image database based on a user search, analyze the image to identify one or more features in the image that are to be suppressed or not to be suppressed, prepare a substitute image that includes one or more portions of the analyzed image having those features that are not to be suppressed, and provide the substitute image to the user.

36. The computer system of claim 35, further comprising an access rights database in the database server with an access rule that limits the content in the substitute image provided to the user.

37. The computer system of claim 35, in which the search server is further configured to determine location and size information for features in the analyzed image that are to be suppressed or not to be suppressed.

38. The computer system of claim 37, in which the search server prepares the substitute image by generating a blank image and using the location and size information to copy to the blank image one or more portions of the analyzed image that include the non-suppressed features.

39. The computer system of claim 38, in which the search server copies one or more portions of the analyzed image by copying pixel information for the non-suppressed features from the analyzed image to the substitute image at one or more locations corresponding to the locations of the non-suppressed features in the analyzed image.

40. The computer system of claim 35, in which the search server prepares a substitute image by removing image information from the analyzed image that fails to correspond to the features that are not to be suppressed.

41. The computer system of claim 35, in which the search server prepares a substitute image by removing image information from the analyzed image that corresponds to the features that are to be suppressed.

42. The computer system of claim 35, in which the search server is further configured to include background image information in the substitute image that simulates background information in the analyzed image.

43. The computer system of claim 35, in which the search server is further configured to include background image information in the substitute image by differentiating foreground pixel information from background pixel information, and removing foreground pixel information from the substitute image that corresponds to the features to be suppressed.

44. The computer system of claim 35, in which the search server is further configured to store the substitute image in the image database for later retrieval.

45. The computer system of claim 44, in which the search server is further configured to act on a retrieved substitute image as an image of a page of content subject to further feature suppression.

* * * * *